Patented Oct. 11, 1949

2,484,328

UNITED STATES PATENT OFFICE 2,484,328

METHOD OF MODIFYING CASTOR OIL

Melvin Agster, Buffalo, and Robert L. Terrill, Williamsville, N. Y., assignors to Spencer-Kellogg and Sons, Inc., Buffalo, N. Y.

No Drawing. Application July 1, 1947,
Serial No. 758,462

8 Claims. (Cl. 260—405.5)

1

The present invention relates to modified castor oil and to a method of producing the same. The invention relates more particularly to the production of a modified castor oil in which sufficient of the hydroxyl groups thereof have been removed to make the so modified castor oil soluble in mineral oil and without inducing excessive drying properties in the oil.

Modified castor oil has been produced heretofore by dehydroxylation with the production of a drying oil. This type of modification is performed in the presence of acid catalysts which, under the influence of heat, aid in removing hydroxyl groups from the castor oil. In general, these catalysts induce a very rapid dehydroxylation and the iodine value of the oil increases extremely rapidly and the ultimate dehydroxylated product possesses drying oil properties. This rapidity of action is characteristic of the generally employed catalysts, namely, sulfuric acid, sodium bisulfate and sulfuric acid esters. The ultimate drying oil is not suitable for admixture with mineral oils for the production of hydraulic fluids and lubricants.

It is an object of the present invention to produce a partially dehydroxylated castor oil which is miscible with mineral oil.

It is another object of the invention to provide a dehydroxylation procedure for castor oil which proceeds sufficiently slowly so that dehydroxylation may be discontinued at a predetermined point with the production of a non drying, partially dehydroxylated castor oil miscible in mineral oils.

It is a further object of the invention partially to dehydroxylate castor oil at elevated temperatures in the presence of a lead compound soluble in the oil at such elevated temperature.

Other objects and advantages will become apparent hereinafter.

In accordance with the invention, castor oil is heated, in the presence of a lead compound soluble in the oil at elevated temperatures, until the acetyl value is reduced to about 60 to 100 and the iodine value raised to 95 to 105 with the production of a clear, brilliant, modified oil which is miscible with mineral oil to the extent of at least one part castor oil to one part mineral oil.

Castor oil, as it appears upon the market commercially, possesses an iodine value of about 88, an acid value of about 2 to 3, an acetyl value of about 150, and a viscosity expressed in Saybolt seconds of about 1360 at 100° F. Unmodified castor oil is generally considered to be relatively immiscible with mineral oils of a lubricating nature. After subjecting commercial castor oil to the partial dehydroxylation modification treatment of the instant invention, the iodine value has increased moderately and will be found

2 to be from about 95 to 105. The acid value will be unchanged, and the viscosity of the oil will be relatively unchanged and remain in the range, expressed in Saybolt seconds, of from 1350 to 1450. However, the acetyl value has been decreased to a considerable degree to the range 60 to 100. The pour point of the so modified castor oil will be at least —30° F. and the modified oil will be now miscible with mineral oils and soluble in hydrocarbon solvents generally. Whereas the original unmodified oil was alcohol soluble, the modified oil will be substantially alcohol insoluble.

The particularly advantageous feature of the present invention resides in the fact that the quantity of lead compound necessary to produce this profound change in the oil is so small as to be soluble in the oil and to remain soluble therein during use. The amount of lead compound, expressed as PbO, necessary to produce the desired dehydroxylation is 0.05% to 0.1% of PbO. Although somewhat higher amounts of lead compound may be employed as catalyst, this is sometimes disadvantageous since, at low temperatures, a small amount of lead soap may be found to have separated from the modified oil, and excessive amounts of lead tend to have affected the viscosity of the finished product.

The lead compounds preferred are litharge, basic carbonate white lead of pigment grade, lead linoleate, or other lead soap, lead hydroxide, lead acetate or any lead compound soluble in castor oil at above about 300° F.

The modification procedure is readily performed by adding from 0.05% to 0.1% lead compound, calculated as lead oxide, PbO, to the oil, thereafter heating the oil slowly with agitation. At about 300° F. the lead compound dissolves in the castor oil and the batch is thereafter heated to the modification temperature within the range about 460° F. to 520° F. and maintained at this temperature for an hour or two or until the iodine value has increased to about 95 to 105, and the acetyl value dropped to 60 to 100. By operating in this fashion, a properly modified oil, which produces substantially no sludge or gum, is produced in contrast with difficulty of control when employing sulfuric acid or its derivatives. Furthermore, the tedious filtration problems encountered, when employing sodium bisulfate, and certain other catalysts, is eliminated. Apparently, with the amount of lead oxide employed, there is no siccative action produced. Furthermore, in contrast to dehydroxylation with sulfuric acid or its derivatives, the acid value does not increase to a point where corrosive properties are induced in the modified oil. The operation lends itself to performance in the usual types of open or closed vessels or kettles normally encountered in oil treating plants, as the operation may be performed either at atmospheric pressure or at reduced pressure in a closed system.

The following examples are merely illustrative of the invention and not to be deemed limitative thereof:

*Example I*

A batch of 20,000 pounds of cold pressed castor oil, after addition thereto of 14 pounds of litharge, was, over a two hour period, heated up to 490° F. under agitation and maintained at this modification temperature for three hours. During the heating of the oil at the modification temperature, test samples were taken and the iodine value determined. When a sample showed iodine value of 98, the heating was discontinued and the oil withdrawn from the kettle and cooled. The oil was clear, brilliant and required no filtration and was found to be miscible with mineral oil to at least one part of castor oil to one part mineral oil. Upon cooling to −20° F., no separation had occurred in the oil, indicating that the lead remained dissolved.

*Example II*

An identical product was prepared by substituting 20 pounds of basic carbonate white lead pigment grade for the litharge employed in the above batch and performing the procedure there described.

*Example III*

An identical type of oil was produced by substituting lead linoleate in the amount of 20 pounds for the litharge given in the first example.

Castor oil, because of its low viscosity change with temperature and its excellent lubricating characteristics, has long been prized as a lubricant. However, where there is a likelihood of the unmodified castor oil mixing with mineral lubricating oil, as for example in an internal combustion engine, a serious difficulty arises; the unmodified castor oil being essentially immiscible with mineral oils, a separation occurs and the lubricating properties of the film tend to break down. Therefore, the modified oil as herein described, is used for lubricating purposes since it is as effective as the unmodified castor oil in lubrication efficiency and possesses the further advantage of being soluble in mineral oils, thus obviating the possibility of lubricant film break down. In addition, the modified castor oil does not increase unduly in viscosity or form gum when used as a lubricant.

Of even more importance is the use of the herein described modified oil as a hydraulic fluid, and of blends thereof with mineral oils for this purpose. As specific uses as a hydraulic fluid may be mentioned the use in shock absorbers, in hydraulic brake systems, and in recoil cylinders. The modified castor oil possesses uniquely desirable characteristics for this purpose: for example, proper viscosity and desirable viscosity-temperature characteristics, mobility at very low temperatures, and absence of corrosive effects, and lack of tendency to form gum and sludge. Further, the modified castor oil being soluble in mineral oils, it can be used for such hydraulic fluids in blends with hydrocarbons and other solvents without phase separation, which would impair hydraulic performance.

What is claimed is:

1. The method of modifying castor oil which comprises partially dehydroxylating the oil by heating the same at temperatures within the range 460° F. to 520° F. in the presence of a lead compound soluble in castor oil at about 300° F. in an amount within the range 0.05% to 0.1% calculated as PbO to reduce the acetyl value to within the range 60 to 100 and raise the iodine value to within the range 95 to 105 whereby the resultant oil is non-drying and miscible in mineral oil.

2. The method of modifying castor oil which comprises partially dehydroxylating the oil by heating the same at a temperature within the range 460° F. to 520° F. in the presence of 0.05% to 0.1% litharge on the weight of the oil with the production of a modified non-drying oil having an acetyl value within the range 60 to 100 and an iodine value within the range 95 to 105.

3. The method of modifying castor oil which comprises partially dehydroxylating the oil by heating the same at a temperature within the range 460° F. to 520° F. in the presence of 0.05% to 0.1% lead soap on the weight of the oil, calculated as PbO with the production of a modified non-drying oil having an acetyl value within the range 60 to 100 and an iodine value within the range 95 to 105.

4. The method of modifying castor oil which comprises partially dehydroxylating the oil by heating the same at a temperature within the range 460° F. to 520° F. in the presence of 0.05% to 0.1% basic carbonate white lead, calculated as PbO with the production of a modified non-drying oil having an acetyl value within the range 60 to 100 and an iodine value within the range 95 to 105.

5. A composition of matter essentially consisting of dehydroxylated non-drying castor oil containing dissolved therein 0.05% to 0.1% of a lead compound soluble in castor oil at about 300° F., calculated as PbO and having an iodine value from 95 to 105 and an acetyl value of from 60 to 100.

6. A composition of matter essentially consisting of dehydroxylated non-drying castor oil containing dissolved therein 0.05% to 0.1% of litharge, and having an iodine value from 95 to 105 and an acetyl value of from 60 to 100.

7. A composition of matter essentially consisting of dehydroxylated non-drying castor oil containing dissolved therein 0.05% to 0.1% of lead soap calculated as PbO, and having an iodine value from 95 to 105 and an acetyl value of from 60 to 100.

8. A composition of matter essentially consisting of dehydroxylated non-drying castor oil containing dissolved therein 0.05% to 0.1% of basic carbonate white lead calculated as PbO, and having an iodine value from 95 to 105 and an acetyl value of from 60 to 100.

MELVIN AGSTER.
ROBERT L. TERRILL.

REFERENCES CITED

The following references are of record in the file of this patent:

UNITED STATES PATENTS

| Number | Name | Date |
|---|---|---|
| 1,963,239 | Maverick | June 19, 1934 |
| 2,034,405 | McLaren | Mar. 17, 1936 |
| 2,084,974 | Kaufman | June 22, 1937 |
| 2,205,183 | Woodhouse | June 18, 1940 |
| 2,290,165 | Cherry | July 21, 1942 |